No. 669,021.  
H. M. BREEN.  
CHECKING SYSTEM FOR DETERMINING THE FORM VALUE OF RACE HORSES.  
(Application filed Apr. 17, 1900.)  
(No Model.)  
Patented Feb. 26, 1901.

Fig. 1.

| | | | |
|---|---|---|---|
| 1—Ran a game race. | 14—Slow to begin. | 22—Chances hurt by delay at post. | 30—Ran away before start. |
| 2—Won handily. | 15—Quit when pinch came. | 23—Pocketed. | 31—Ran race at post. |
| 3—Won driving. | 16—Came strong at finish. | 24—Kept out of it too long. | 32—Had no speed. |
| 4—Ridden out. | 17—Met with interference. | 25—Bolted. | 33—Showed improvement. |
| 5—Outclassed. | 18—Could not go the route. | 26—Fell. | 34—Did not run his race. |
| 6—Short. | 19—Wants longer route. | 27—Taken into worst going. | 35—Lost rider. |
| 7—Sulked. | 20—Track did not suit. | 28—Was practically left at post. | 36—Rounding to. |
| 8—Bad actor. | 21—Killed off pacemaking. | 29—Broke down. | 37—Going back. |
| 9—Overweighted. | | | 38—Consistant performer. |
| 10—Eased up. | | | |
| 11—Tired at end. | | | |
| 12—Poorly ridden. | | | |
| 13—Ran badly. | | | |

Fig. 2.

FIRST RACE.

For 3-year-olds and upward; six furlongs.

SIDNEY LUCAS, 3, ch. c, Topgallant—Addie C.  
Thompson-Bros. Wt. 108. Ind. 852.  
N. O. 1. Mar. 5. Wt.101. T.f. 1½m. 5.st. 2.44¾— 70  
N. O. 1. Mar.12. Wt.110. T.f. 1¼m. 8.st. 2.08 — 96  
N. O. 2. Mar.17. Wt.115. T.s. 1⅞m. 7.st. 2.00 — 71  
N. O. 7. Mar.22. Wt.112. T.h. 7f. 7.st. 1.32½—15  
N. O. 5. Mar.24. Wt.112½. T.h. 1m. 9.st. 1.47¾—33

SAN DURANGO, ch.g, 5, Amigo—Cuban Queen.  
Hogan & Muldoon. Wt. 107. Ind. 828.  
N. O. 1. Mar.22. Wt.109½.7.sl. 7f. 7.st. 1.32½— 64  
N. O. 1. Mar.21. Wt.110. T.s. 6f. 9.st. 1.16½— 80  
N. O. 5. Mar.15. Wt.107. T.h. 7f. 6.st. 1.31½— 30  
N. O. 4. Jan.30. Wt.109. T.f. 6½f. 6.st. 1.21½—50  
N. O. 3. Jan.27. Wt.111. T.f. 6f. 8.st. 1.14 — 87

Fig. 3.

852 FOURTH RACE — The Turf Congress Handicap, value $2,755; for 3 year olds and upwards; one mile; off first break at 4.00; start good; won easily; place same, Time .26¼, .51¾, 1.19, 1.47¾ Winner b.h. 5, by Tristan — Fiona.

| Index. | Starters | Wt. | St. | ¼. | ½. | ¾. | ⅞. | Fin. | Jockeys. | Op. | Cl. | Pl. |
|---|---|---|---|---|---|---|---|---|---|---|---|---|
| 608 | *Trillo. | 110. | 3. | 1² | 1² | 1²½ | 1² | 1² | Mitchell. | — | — | — |
| 780 | Knight Banneret. | 97. | 4. | 4ʰ | 5² | 4ʰ | 3ʰ | 2½ | Newcom. | 4 | 4 | ⅘ |
| (804) | Eva Rice. | 105. | 1. | 3¹ | 3² | 3⁴ | 2½ | 3⁹ | Winkfield. | 10 | 10 | 4 |
| (828) | Compensation. | 104. | 5. | 6ʰ | 6¹ | 5³ | 5¹ | 4² | Moody. | 2 | ⅗ | ⅘ |
| 828 | *Sidney Lucas. | 112½ | 9. | 9 | 9 | 7ʰ | 6³ | 5ʰ | Vandusen. | — | — | — |
| 816 | Prince of Veronia. | 112. | 6. | 8³ | 8⁴ | 8ʰ | 7³ | 6¹ | McJoynt. | 8 | 10 | 4 |
| 828 | Ed. Gartland II. | 112. | 2. | 2¹ | 2¹ | 2ʰ | 4ʰ | 7² | Boland. | 6 | ½ | ⅘ |
| (816) | Arthur Behan. | 100. | 8. | 7² | 7¹ | 9 | 8½ | 8³ | L. Rose. | 15 | 15 | 6 |
| (840) | Cathedral. | 100. | 7. | 5¹ | 4ʰ | 6½ | 9 | 9 | J. Waldo. | 6 | 7 | 2 |

Barred in the betting. Trillo had all the speed. Eva Rice tired in run home. Sidney Lucas did not try until last quarter; closed big gap. Ed. Gartland quit last quarter. Show—Banneret, 45; Eva Rice, 2; Compensation, out.

WITNESSES:  
L. C. Hills.  
E. R. Ruppert.

INVENTOR  
Howard M. Breen  
BY A. M. Wieson  
Attorney

UNITED STATES PATENT OFFICE.

HOWARD M. BREEN, OF NEW YORK, N. Y.

CHECKING SYSTEM FOR DETERMINING THE FORM VALUE OF RACE-HORSES.

SPECIFICATION forming part of Letters Patent No. 669,021, dated February 26, 1901.

Application filed April 17, 1900. Serial No. 13,176. (No model.)

*To all whom it may concern:*

Be it known that I, HOWARD M. BREEN, a citizen of the United States, residing at New York, in the county of New York and State of New York, have invented certain new and useful Improvements in Checking Systems for Determining the Form Value of Race-Horses; and I do hereby declare the following to be a full, clear, and exact description of the invention, such as will enable others skilled in the art to which it appertains to make and use the same.

This invention relates to certain new and useful improvements in checking systems for determining form value of race-horses.

The object of the invention is to provide a system to enable a student of the races to understand the form value of a horse in his previous races. For example, if a horse leads a field of ten starters in a mile race from start to finish his form value for that particular race is one hundred. If in another similarly-conditioned race he runs third throughout the race his form value would be seventy; but in actual, not in supposed, races the position of a horse is constantly changing. There are also weight, distance, track, and other elements entering into the problem before proper form value can be allotted to a horse in any particular race or run-off event, and all of these conditions have been taken into consideration, so that the student will be enabled to thoroughly understand the previous conditions as well as races of a horse when calculating the latter's chances for a contemplated race.

Briefly described, the system consists of a form-sheet having a series of inscriptions indicative of the actions of a horse during a race, an entry-sheet having thereon the names of the horses entered in a future race, and a detailed description of the form displayed by each horse in previous races, each name entered on the entry-sheet having an index-number, together with a racing-chart having an index-number for reference to the entry-sheet, this racing-chart bearing a full description of the race, to which the index-number of the entry-sheet refers. The system aims to provide this in an extremely simple and efficient manner, as will be more clearly described and pointed out hereinafter.

In the accompanying drawings, Figure 1 is a plan view of the form-sheet of reference. Fig. 2 is a plan view of the entry-sheet, showing a race with two horses entered. Fig. 3 is a plan view of the racing-chart.

Referring to the drawings by reference-numerals, 1 indicates the form-sheet, upon which is arranged four columns 2, 3, 4, and 5 of suitable form inscriptions, which are consecutively numbered, as at 6, with reference-numerals, although a reference-letter may be employed.

The numeral 7 indicates the entry-sheet, upon which is arranged each horse's name entered in the race, as at 8, for example, the names of two horses are given in the drawings although the number of the names depends upon the number of entries in the race. Following each horse's name is a detailed description of the sex, age, breeding, owner, and weight to be carried in the said race, as at 9, and at the end of such description is placed the index-number for the racing-chart, as at 10. Below the inscription 9 on the entry-sheet is arranged the previous performances of the horse at certain places, as at 11, with the form value of the horse in each race, as at 12, and the reference numeral or letter, as at 13, for referring to a certain inscription upon the form-sheet to enable the student to understand the form value set forth of the horse for the certain race.

The reference-numeral 14 indicates the racing-chart, which is provided with the index-number "15," and this chart has arranged thereon the detailed conditions and description of the previous race of the horse, as well as the index-number, as at 16, by which it may be referred to from the preceding chart 7.

A detailed description of the system consists of a condensation on the entry-sheet of a horse's past races, covering nine phases of each race, and a reference-mark in the shape of a small figure or letter at the extreme end of the line, designating some factor in a horse's condition or form which contributed toward or detracted against the horse's winning that race and referring to a certain inscription upon the form-sheet—to wit, first, the name by which the race-track is best known or its recognized abbreviation; second, the position in which the horse finished at the end of the race; third, the date upon which the race was run; fourth, the weight carried by the horse in the race of that date; fifth, the condition of the race-track on the day the certain race was run; sixth, the distance of the race on that date; seventh, the number of starters or competing horses in the race; eighth, the time in which the race was run, and, ninth, the number of points scored by the horse in the race upon a basis of one hundred calculated upon a series of units bearing upon the horse's different positions at equidistant stages of that particular race. For instance, the inscription at the side of the name "Sidney Lucas" shows that the horse entered is three years old, is a chestnut colt sired by a horse known as "Topgallant," and foaled by a mare known as "Addie C." Below the same shows the owner's name to be "Thompson Bros.," the weight to be carried is shown to be one hundred and eight pounds, and the index-number of the racing-chart giving a detailed description of the horse's previous race is "852," and below the latter inscription shows that the horse raced at New Orleans, finished first, on March 5, weight carried one hundred and one pounds, track fast, distance of race one and one-half miles, five starters or competitors, time of race 2.44¾, with seventy points to the horse's credit. The reference designation in small figures at the side of the point-mark "70" shows upon consultation with the form-sheet that the horse "tired at the end of the race." The inscriptions below are repetitions of like terms applied to races run upon different dates and under different conditions.

The entry-sheets and racing-charts of each day's races and the form-sheet are preserved by the student, so that as the daily publication of the various races appear a reference to the former can be made by the student. For instance, the index-number "852," as given to "Sidney Lucas" in the illustration made on the entry-sheet, indicated to the student that to obtain a detail description of the horse's previous race he should refer to the racing-chart (which he has preserved) bearing the index-number "852." When he refers to this chart, he learns the details of the previous race in which the horse participated, and on this particular chart he will also find an index-number indicated at "16," which will refer him to a previous racing-chart, also giving a description of a race in which the horse participated, so that he is enabled to accurately determine how the horse raced in several different races and under different conditions. It will be seen, therefore, that the index-number "10" on the entry-sheet indicates to the student the index-number "15" of the racing-chart to which he should refer first. If he desires details of other previous races of the horse, the index-number "16" on the racing-chart indicates to what index-number "15" he should refer.

The entry-sheet, Fig. 2, shows a race with two entries. The racing-chart for the entry of "Sidney Lucas" only is shown in Fig. 3.

A like chart for the entry of "San Durango" is of course provided, and the horse's form in different races determined in a like manner.

It is thought the many advantages of my improved system for determining the form value of a horse can be readily understood from the foregoing description when taken in connection with the accompanying illustration, and it will be noted that minor changes can be made in the details without departing from the general spirit of my invention.

Having fully described my invention, what I claim as new, and desire to secure by Letters Patent, is—

1. In a checking system for determining the form value of race-horses, the combination of a form-sheet having a series of consecutively-numbered indicating inscriptions, an entry-sheet provided with the names of the horses entered in a coming race, each name entered thereon having an index-number, said sheet having indicating inscriptions of the previous performances of each horse entered, and indicating-numerals referring to the form-sheet, and a racing-chart having an index-number corresponding to one of the index-numbers on the entry-sheet, substantially as described.

2. In a system for determining the form value of race-horses, the combination of a form-sheet having a series of inscriptions indicative of the actions of a horse during a race, an entry-sheet having thereon the names of the horses entered in a future race, and a detail description of the form displayed by each horse in previous races, each name entered on the entry-sheet having an index-number, and a racing-chart having an index-number corresponding to one of the index-numbers on the entry-sheet, said chart bearing a full description of the race to which the index-number of the entry-sheet refers, substantially as described.

3. A system for determining the form value of race-horses comprising a form-sheet having a series of inscriptions indicative of the manner in which a horse performed in a previous race, an entry-sheet having thereon the names of the horses entered in a future race and a detailed description of the form displayed by each horse in previous races, said sheet having an index-number for each name thereon, a form-number for the previous races given on the sheet, and an indicating-number referring to one of the descriptions on the form-sheet, and a racing-chart having a description of a previous race with an index-number corresponding to one of the index-numbers on the entry-sheet, substantially as shown and described.

In testimony whereof I affix my signature in presence of two witnesses.

HOWARD M. BREEN.

Witnesses:
VICTOR RYBERG,
EDWARD HENSEY.